US012803328B2

(12) United States Patent
Yamamoto et al.

(10) Patent No.: US 12,803,328 B2
(45) Date of Patent: Nov. 17, 2026

(54) FILTER DEVICE

(71) Applicant: YAMASHIN-FILTER CORP., Kanagawa (JP)

(72) Inventors: Yasuyuki Yamamoto, Ibaraki (JP); Takeshi Kobayashi, Ibaraki (JP); Nobuyuki Kitajima, Kanagawa (JP); Masanori Wakabayashi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 19/304,709

(22) Filed: Aug. 20, 2025

(65) Prior Publication Data

US 2025/0373076 A1 Dec. 4, 2025

Related U.S. Application Data

(63) Continuation of application No. PCT/JP2023/047069, filed on Dec. 27, 2023.

(30) Foreign Application Priority Data

Feb. 22, 2023 (JP) ................................ 2023-026773

(51) Int. Cl.
*H02J 50/00* (2016.01)
*H01F 38/14* (2006.01)
(Continued)

(52) U.S. Cl.
CPC ............ *H02J 50/005* (2020.01); *H01F 38/14* (2013.01); *H02J 50/10* (2016.02); *H02J 50/80* (2016.02); *H01F 2038/143* (2013.01)

(58) Field of Classification Search
CPC .......... H02J 50/005; H02J 50/10; H02J 50/80; H01F 38/14; H01F 2038/143; B01D 29/11; B01D 35/00; B01D 46/42
See application file for complete search history.

(56) References Cited

U.S. PATENT DOCUMENTS

2009/0246090 A1 10/2009 Burke et al.
2021/0023495 A1 1/2021 Miller et al.

FOREIGN PATENT DOCUMENTS

JP 2005-101392 A 4/2005
JP 2007-180188 A 7/2007
(Continued)

OTHER PUBLICATIONS

International Search Report issued in PCT/JP2023/047069 mailed on Mar. 19, 2024 with English Translation (5 pages).
(Continued)

*Primary Examiner* — Daniel Cavallari
(74) *Attorney, Agent, or Firm* — Nakanishi IP Associates, LLC

(57) ABSTRACT

A filter device includes a filter element, a housing with the filter element inside thereof, and a wireless power supply unit including an external member provided outside the housing, an internal member provided inside the housing, and a power supply unit that supplies power to an external coil included in the external member. The housing includes a plate-like portion having a plate-like shape and formed of a ferromagnetic body, and the external member and the internal member are provided with the plate-like portion interposed therebetween. The external member includes an external core provided with an external coil. The internal member includes an internal coil and an internal core provided with the internal coil. The external core includes a first end member and a first coupling portion provided with the external coil, and the internal core includes a second end member and a second coupling portion provided with the internal coil.

11 Claims, 5 Drawing Sheets

(51) Int. Cl.
*H02J 50/10* (2016.01)
*H02J 50/80* (2016.01)

(56) References Cited

FOREIGN PATENT DOCUMENTS

| | | | |
|---|---|---|---|
| JP | 2011-518653 | A | 6/2011 |
| JP | 2021-512778 | A | 5/2021 |
| KR | 10-2013-0037916 | A | 4/2013 |
| WO | 2009/120271 | A1 | 10/2009 |
| WO | 2019/157187 | A1 | 8/2019 |

OTHER PUBLICATIONS

Written Opinion of International Searching Authority issued in PCT/JP2023/047069 mailed on Mar. 19, 2024 with English Translation (6 pages).

(A)

(B)

(A)

(B)

(A)

(B)

FILTER DEVICE

CROSS-REFERENCE TO RELATED APPLICATIONS

This application is a continuation application of International Patent Application No. PCT/JP2023/047069 filed on Dec. 27, 2023, which claims priority to Japanese Patent Application No. 2023-026773 filed on Feb. 22, 2023, the entire contents of which are incorporated by reference.

TECHNICAL FIELD

The present invention relates to a filter device.

BACKGROUND ART

Patent Document 1 discloses a filter system that performs wireless power transmission. In this filter system, a wireless power receiver is associated with a filter body, and the wireless power receiver includes a feedback channel circuit. The feedback channel circuit is a feedback channel circuit that is in communication with a receive antenna, a control circuit in electrical communication with the wireless power receiver, and a control circuit, and configured to perform transmission over a channel spaced from the receive antenna.

CITATION LIST

Patent Document

Patent Document 1: JP 2021-512778 A

In Patent Document 1, a wireless power transmitter and a wireless power receiver can be disposed at separate locations. However, in the invention described in Patent Document 1, the power transmission cannot be performed when a housing is made of a ferromagnetic body such as iron.

SUMMARY OF INVENTION

One or more aspects of the present invention is to provide a filter device that enables wireless power supply with a housing made of a ferromagnetic body interposed therebetween.

A filter device according to one or more aspects of the present invention includes, for example, a filter element, a housing provided with the filter element inside thereof, and a wireless power supply unit including an external member provided outside the housing, an internal member provided inside the housing, and a power supply unit that supplies power to an external coil included in the external member, wherein the housing includes a plate-like portion made of metal formed of a ferromagnetic body, the external member and the internal member are provided with the plate-like portion interposed therebetween, the external member includes an external core provided with the external coil, the internal member includes an internal coil and an internal core provided with the internal coil, the external core includes a first end member and a first coupling portion provided with the external coil, the internal core includes a second end member and a second coupling portion provided with the internal coil, and a first end that is a distal end of the first end member and a second end that is a distal end of the second end member face each other at a plurality of separated positions with the plate-like portion interposed therebetween.

According to one or more aspects of the filter device of the present invention, the external core of the external member provided outside the housing and the internal core of the internal member provided inside the housing are provided with the plate-like portion formed of a ferromagnetic body interposed therebetween, and the distal end of the external core and the distal end of the internal core face each other at the plurality of positions with the plate-like portion interposed therebetween. Accordingly, wireless power supply can be performed with the housing formed of a ferromagnetic body interposed therebetween.

The external core and the internal core may be formed of rod-like or belt-like members, the first end member may include a third end member and a fourth end member that are spaced apart from each other, the first coupling portion may couple the third end member and the fourth end member, the second end member may include a fifth end member and a sixth end member that are spaced apart from each other, the second coupling portion may couple the fourth end member and the fifth end member, a third end that is a distal end of the third end member may face a fifth end that is a distal end of the fifth end member with the plate-like portion interposed therebetween, and a fourth end that is a distal end of the fourth end member may face a sixth end that is a distal end of the sixth end member with the plate-like portion interposed therebetween. As a result, a pair of strong magnetic fields are generated, and power supply is enabled with a magnetic body interposed therebetween.

The first end member and the second end member may be formed in a tubular shape by bending belt-like members, the first coupling portion may be provided at a hollow portion of the tubular first end member, and the second coupling portion may be provided at a hollow portion of the tubular second end member. As a result, a pair of strong magnetic fields are generated, and power supply is enabled with a magnetic body interposed therebetween.

The power supply unit may modulate a current caused to flow through the external coil. This enables wireless communication from an outside to an inside of the housing.

An adjustment unit that changes an impedance of a circuit including the internal coil, and an acquiring unit that acquires a change in the impedance of the circuit by the adjustment unit by measuring a current flowing through the external coil may be provided. This enables wireless communication from the inside to the outside of the housing.

A sensor provided inside the housing and adjacent to the internal member may be provided, and the adjustment unit may change the impedance based on a measurement result of the sensor. Accordingly, the measurement result of the sensor can be transmitted wirelessly.

According to one or more aspects of the present invention, wireless power supply can be performed with a housing formed of a ferromagnetic body interposed therebetween.

DESCRIPTION OF EMBODIMENTS

Embodiments of the present invention will be described below in detail with reference to the drawings. A filter device according to the present invention removes dust and other particles from oil, fuel, urea water, and other liquids. In the present embodiment, a fuel filter that removes dust and other particles contained in fuel is used as an example of a filtration device, but the filtration device is not limited to the fuel filter and can be used for return filters, for example. In addition, in the present embodiment, while hydraulic oil is described as an example of liquid to be filtered, the liquid to be filtered is not limited to the hydraulic oil, and various types of liquid containing additives, for example, fuel (petroleum-based or ethanol-based) may be used.

First Embodiment

Figure 1:
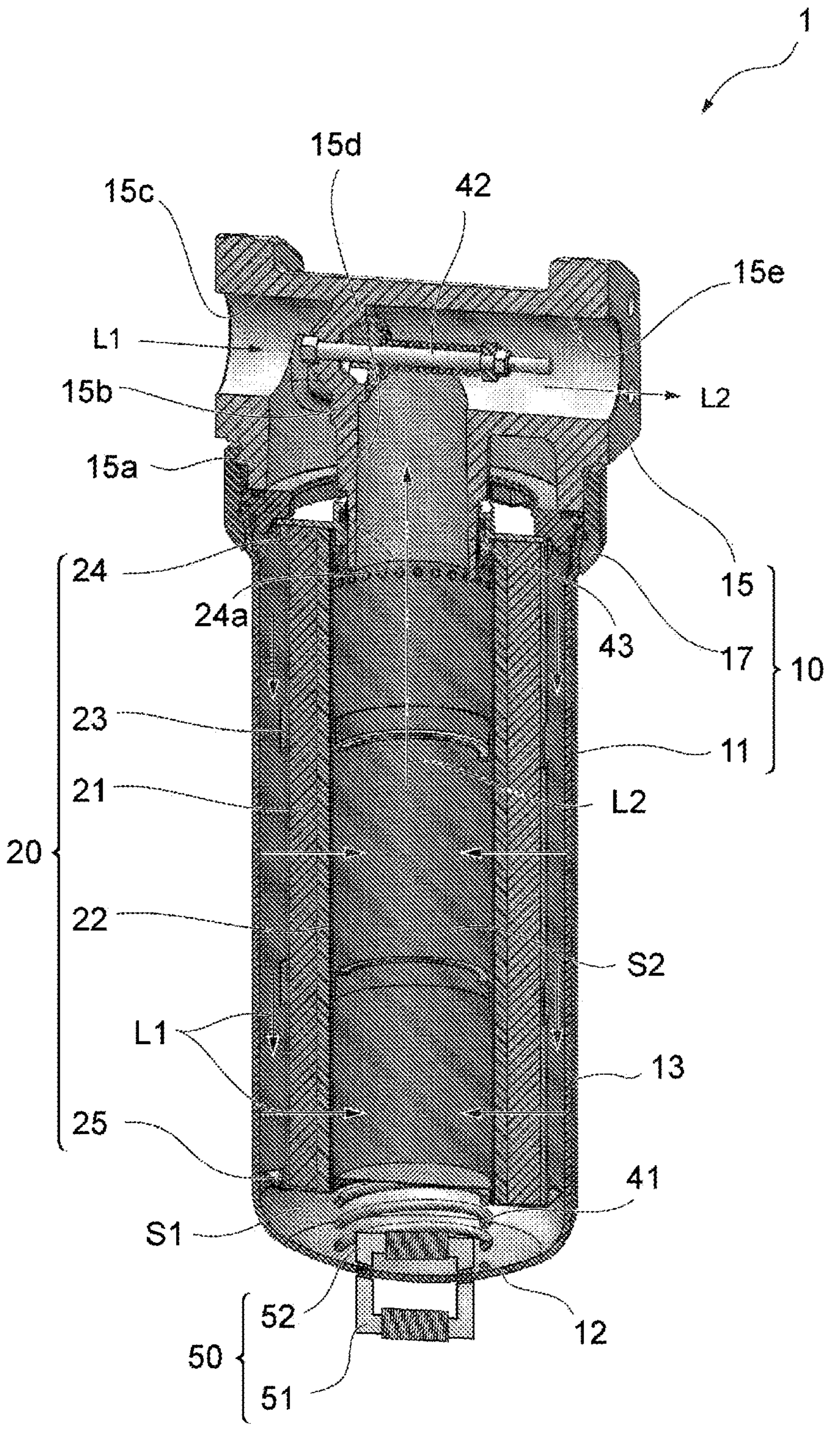
FIG. 1 is a diagram illustrating an overview of a filter device 1 according to a first embodiment of the present invention.

FIG. 1 is a diagram illustrating an overview of the filter device 1 according to a first embodiment of the present invention. Note that in FIG. 1, hatching that indicates a cross section is partly omitted.

The filter device 1 mainly includes a housing 10, a filter element 20, and a wireless power supply unit 50. The housing 10 mainly includes a case 11 and a head 15. The case 11 and the head 15 are formed of a ferromagnetic body. The ferromagnetic body is a material having a property (ferromagnetism) of being strongly magnetized by a magnetic field applied from an outside and remaining magnetized even when the magnetic field is removed. Examples of the ferromagnetic body include iron, nickel, cobalt, and alloys (carbon steel, alloy steel, cast iron, and the like) or oxides (ferrite and the like) containing such metals. In the present embodiment, cast iron is used for the case 11 and the head 15.

The case 11 is a member having a bottomed cylindrical shape including one end substantially closed, and another end open. A side surface 13 of the case 11 is tubular, and a lower end of the side surface 13 is covered with a bottom surface 12. An upper end of the side surface 13 is open. The bottom surface 12 and the side surface 13 (corresponding to a plate-like portion of the present invention) are formed using plate-like members.

An opening of the case 11 is mounted to the head 15. The case 11 and the head 15 are fixed to each other by a mounting member 17 provided along outer peripheries of the case 11 and the head 15. However, the mounting member 17 is not necessarily required, and the method of fixing the case 11 and the head 15 is not limited to this. For example, the case 11 and the head 15 may be fixed to each other by screwing a male screw and a female screw provided at the case 11 and the head 15, respectively.

When the case 11 is mounted to the head 15, the filter element 20 is mounted to a central tube **15*b* (which will be described in detail below) of the head 15. Additionally, an elastic member 41 such as a coil spring is provided between the filter element 20 and the bottom surface 12, and the elastic member 41 presses the filter element 20 toward the head 15. Accordingly, the filter element 20 is housed inside the case 11**.

The filter element 20 mainly includes a filtration member 21, an inner tube 22, an outer tube 23, and plates 24 and 25. The inner tube 22 is a member having a substantially hollow cylindrical shape with openings at both ends and provided with a plurality of holes (not illustrated) through which liquid passes at an entire surface thereof. The outer tube 23 is a belt-like member that covers a part of the filtration member 21. Note that the inner tube 22 and the outer tube 23 are not necessarily required.

The filtration member 21 has a substantially hollow cylindrical shape having a thickness in a radial direction. The filtration member 21 is formed by pleating filter paper having a sheet-like shape and made of a synthetic resin, paper, or the like, and connecting both ends of the filter paper pleated to roll the filter paper. However, the form of the filtration member 21 is not limited to this.

One end (an end on an upper side in FIG. 1) of the filtration member 21 is provided with the plate 24, and another end (an end on a lower side in FIG. 1) is provided with the plate 25.

The plate 24 is provided at an upper end of the filtration member 21 and the inner tube 22. A central tube **15*b* of the head 15 is inserted into the plate 24. A sealing member 43 (for example, an O-ring) is provided between the plate 24 and the central tube 15*b*. The plate 24 and the central tube 15*b* are sealed by the sealing member 43 such that liquid does not leak outside between the plate 24 and the central tube 15*b*. Additionally, since the plate 24 is provided with the inner tube 22, when the central tube 15*b* is inserted into the plate 24, an internal space of the inner tube 22 communicates with an internal space of the central tube 15*b***.

The head 15 includes a tubular portion **15*a* and the central tube 15*b*. The tubular portion 15*a* and the central tube 15*b* have a cylindrical shape and protrude toward the case 11. The tubular portion 15*a* is inserted into the mounting member 17**.

The head 15 includes a hole **15*c* serving as an inflow path, and a hole 15*d* and a hole 15*e* serving as outflow paths. A wall surface separating the hole 15*c* and the hole 15*e* is provided with a bypass valve 42. The hole 15*c* communicates with a space S1 between the case 11 and the filter element 20, and the hole 15*d* and the hole 15*e* communicate with an inside (space S2) of the inner tube 22**.

Liquid L1 to be filtered is supplied to the filter device 1 through the hole **15*c*. The liquid L1 (see solid arrows in FIG. 1) flows into the space S1, and is subsequently filtered by the filtration member 21 to flow out to the space S2. Further, liquid L2 after filtration that has flowed out to the inside of the inner tube 22 (see a double-dotted arrow in FIG. 1) is discharged outside the filter device 1** from the outflow path.

Note that although the inflow path and the outflow path are provided at the head 15 in the present embodiment, it is sufficient that the inflow path and the outflow path are provided at the housing 10. For example, the inflow path and the outflow path may be provided at the case 11.

Since the elastic member 41 is provided, a space is present between the bottom surface 12 and the filter element 20 (plate 25). This space is provided with the wireless power supply unit 50 and a sensor 60 (not illustrated in FIG. 2, see FIG. 3). Detailed description on the wireless power supply unit 50 will be provided below.

Figure 2:
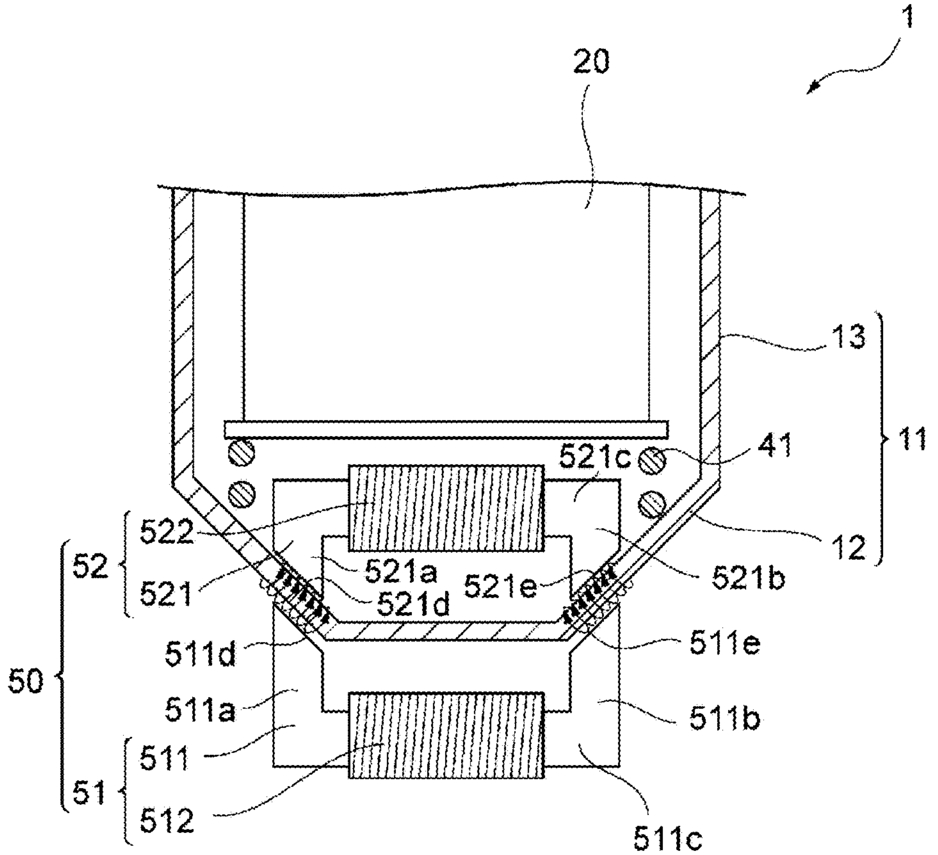
FIG. 2 includes diagrams each illustrating a main part of the filter device, in which (A) is a cross-sectional view and (B) is a bottom view.
Figure 2:
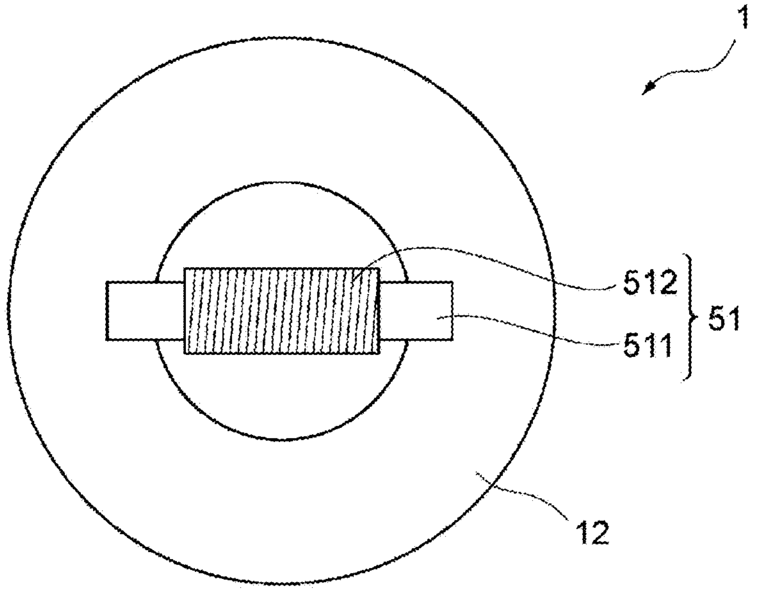

FIG. 2 includes diagrams each illustrating a main part of the filter device, in which (A) is a cross-sectional view and (B) is a bottom view. The wireless power supply unit 50 mainly includes an external member 51 and an internal member 52. The external member 51 is provided outside the housing 10, and the internal member 52 is provided inside the housing 10. Further, the external member 51 and the internal member 52 are provided with the case 11, here, with the bottom surface 12 interposed therebetween.

The external member 51 mainly includes a core 511 and a coil 512 provided at the core 511. The internal member 52 mainly includes a core 521 and a coil 522 provided at the core 521. The core 511 and the core 521 have substantially the same shape.

The core 511 includes end members 511*a* and 511*b* (corresponding to a first end member of the present invention) spaced apart from each other, and a coupling portion 511*c* (corresponding to a first coupling portion of the present invention) coupling the end member 511*a* and the end member 511*b*. The coil 512 is provided at the coupling portion 511*c*.

Same as the core 511, the core 521 also includes end members 521*a* and 521*b* (each corresponding to a second end member of the present invention) spaced apart from each other, and a coupling portion 521*c* (corresponding to a second coupling portion of the present invention) coupling the end member 521*a* and the end member 521*b*. The coil 522 is provided at the coupling portion 521*c*.

In the present embodiment, the cores 511 and 521 are formed of rod-like or belt-like members. Although the cores 511 and 521 have a rectangular U-shape in the present embodiment, the cores 511 and 521 may have a U-shape or a V-shape. Note that in the case of the U-shape or the V-shape, two rod-like portions on both sides are end members, and a length and a shape of a coupling portion coupling the two end members are optional. For example, the coupling portion may have or need not have an arc shape. Further, in the case of the V-shape, the coupling portion is not necessarily required. The end member 511*a* corresponds to a third end member of the present invention, and the end member 511*b* corresponds to a fourth end member of the present invention. Further, the end member 521*a* corresponds to a fifth end member of the present invention, and the end member 521*b* corresponds to a sixth end member of the present invention.

A distal end 511*d* (corresponding to a third end of the present invention) of the end member 511*a* faces a distal end 521*d* (corresponding to a fifth end of the present invention) of the end member 521*a* with the bottom surface 12 interposed therebetween. Further, a distal end 511*e* (corresponding to a fourth end of the present invention) of the end member 511*b* faces a distal end 521*e* (corresponding to a sixth end of the present invention) of the end member 521*a* with the bottom surface 12 interposed therebetween. Therefore, a magnetic field is generated between the distal end 511*d* and the distal end 521*d*, and a magnetic field is generated between the distal end 511*e* and the distal end 522*e*.

Further, areas of the distal end 511*d* the distal end 521*d* are substantially the same as each other, and areas of the distal end 511*e* and the distal end 522*e* are substantially the same as each other.

Since distances between the distal end 511*d* and the distal end 521*d* and the bottom surface 12 are short, and distances between the distal end 511*e* and the distal end 522*e* and the bottom surface 12 are short (the distal ends 511*d*, 511*e*, 521*d*, and 522*e* are adjacent to the bottom surface 12), the generated magnetic fields are strong. In addition, the distal end 511*d* and the distal end 511*e* of the core 511 and the distal end 521*d* and the distal end 522*e* of the core 521 face each other at a plurality of separated positions with the bottom surface 12 interposed therebetween, and thus a pair of strong magnetic fields are generated, and thus power can be supplied with a magnetic body interposed therebetween.

Figure 3:
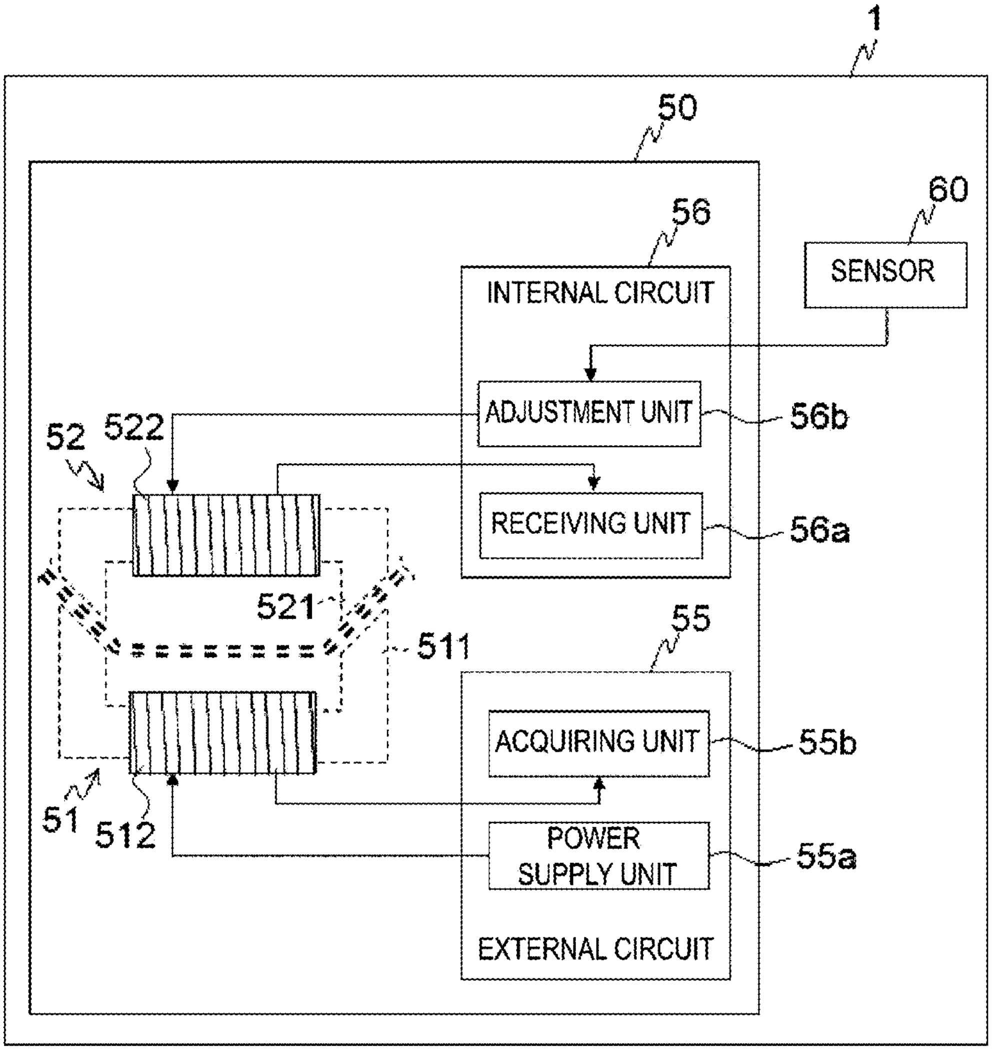
FIG. 3 is a block diagram illustrating an overview of an electrical configuration of the filter device 1.

FIG. 3 is a block diagram illustrating an overview of an electrical configuration of the filter device 1. The wireless power supply unit 50 mainly includes an external circuit 55 and an internal circuit 56. The external circuit 55 mainly includes a power supply unit 55*a* and an acquiring unit 55*b*. The internal circuit 56 mainly includes a receiving unit 56*a* and an adjustment unit 56*b*.

First, power supply by the wireless power supply unit 50 will be described. The power supply unit 55*a* supplies power to the coil 512. When power is supplied by the power supply unit 55*a* and a current flows through the coil 512, a magnetic field is generated between the core 511 and the core 521, and an induced current is generated in the coil 522 due to a change in the magnetic field. The receiving unit 56*a* supplies power generated by the induced current flowing through the coil 522 to a battery (not illustrated). Accordingly, wireless power supply is performed.

Next, wireless communication (data communication) by the wireless power supply unit 50 will be described. The wireless communication includes wireless communication from the external circuit 55 to the internal circuit 56 and wireless communication from the internal circuit 56 to the external circuit 55.

First, the wireless communication from the external circuit 55 to the internal circuit 56 will be described. The power supply unit 55*a* modulates a current flowing through the coil 512 as necessary. For example, the power supply unit 55*a* can perform amplitude modulation, frequency modulation, or phase modulation of an alternating current that is a sinusoidal wave. Further, the power supply unit 55*a* can rectify a sinusoidal wave and modulate the rectified wave into a pulse wave. Note that examples of the modulation into the pulse wave include on-off modulation in which a voltage at the time of off is 0, and on-off modulation with offset in which the voltage at the time of off is not 0. For example, the power supply unit 55*a* may include a rectifier circuit, a modulator circuit, and the like.

The receiving unit 56*a* detects what waveform of signal the power supply unit 55*a* has caused to flow through the coil 522 based on the induced current generated in the coil 512. Further, the receiving unit 56*a* holds a relationship between the waveform that the power supply unit 55*a* caused to flow to the coil 512 and data, and acquires data transmitted from the external circuit 55 to the internal circuit 56 based on the relationship. For example, the receiving unit 56*a* may include a demodulator circuit.

Next, the wireless communication from the internal circuit 56 to the external circuit 55 will be described. The sensor 60 provided at the filter device 1 is, for example, a temperature sensor or a viscosity sensor. The adjustment unit 56*b* changes an impedance of a circuit including the coil 522 based on a measurement result of the sensor 60. For example, the adjustment unit 56*b* increases an impedance of the coil 522 when a temperature of fluid increases. This enables the measurement result of the sensor 60 to be transmitted wirelessly. Note that the adjustment unit 56*b* may include an impedance converter.

The acquiring unit 55*b* measures a current flowing through the coil 512. When the impedance of the coil 522 is changed by the adjustment unit 56*b*, the current flowing through the coil 512 is changed. The acquiring unit 55*b* acquires the change in the impedance of the coil 522 by measuring the current flowing through the coil 512. The acquiring unit 55*b* holds a relationship between the change in the impedance of the coil 522 and data, and acquires data transmitted from the internal circuit 56 to the external circuit 55 based on the relationship.

According to the present embodiment, wireless power supply can be performed by using the wireless power supply unit 50 with the housing 10 (here, the bottom surface 12) formed of a ferromagnetic body interposed therebetween.

Additionally, according to the present embodiment, the power supply unit 55*a* modulates the current caused to flow through the coil 512, thereby enabling the wireless communication from the external circuit 55 to the internal circuit 56.

Additionally, according to the present embodiment, the adjustment unit 56*b* changes the impedance of the circuit including the coil 522, thereby enabling the wireless communication from the internal circuit 56 to the external circuit 55.

Note that in the present embodiment, the external member 51 and the internal member 52 are provided to face each other with the bottom surface 12 interposed therebetween, but the position of the wireless power supply unit 50 is not limited thereto. For example, the external member 51 and the internal member 52 may be provided to face each other with the head 15 (for example, the tubular portion 15*a*) interposed therebetween. For example, a side surface or a top surface of the head 15 may be a plate-like portion formed of a plate-like member, and the external member 51 and the internal member 52 may be provided with the plate-like portion interposed therebetween.

In addition, in the present embodiment, the core 511 and the core 521 have substantially the same shape, but the shapes of the cores 511 and 521 may be different from each other. For example, a height of the core 511 may be greater than a height of the core 521. By increasing the height of the core 511, the number of turns or a size of the coil 512 can be increased.

Second Embodiment

A second embodiment of the present invention is an embodiment in which a shape of a wireless power supply unit is different. Hereinafter, the filter device 2 according to the second embodiment will be described. Note that the same components as those in the first embodiment are denoted by the same reference numerals, and descriptions thereof will be omitted.

Figure 4:
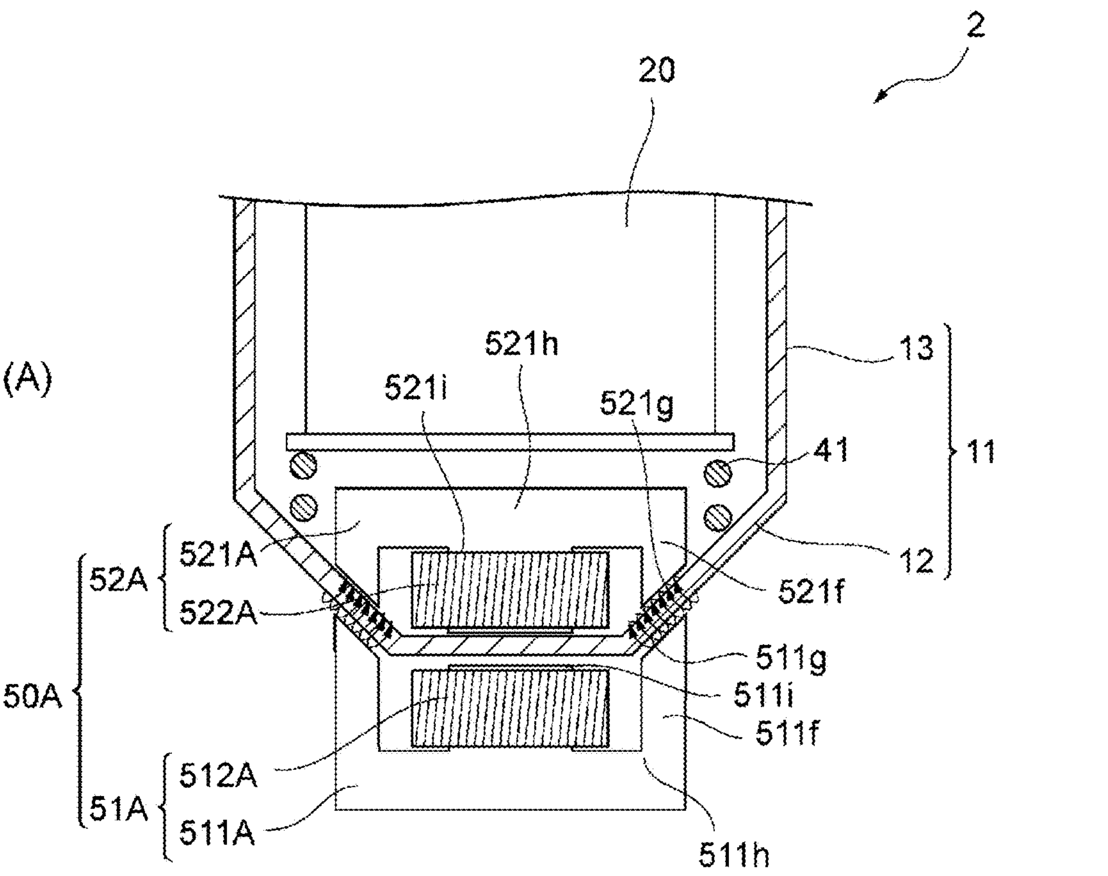
FIG. 4 includes diagrams each illustrating a main part of a filter device 2, in which (A) is a cross-sectional view and (B) is a bottom view.
Figure 4:
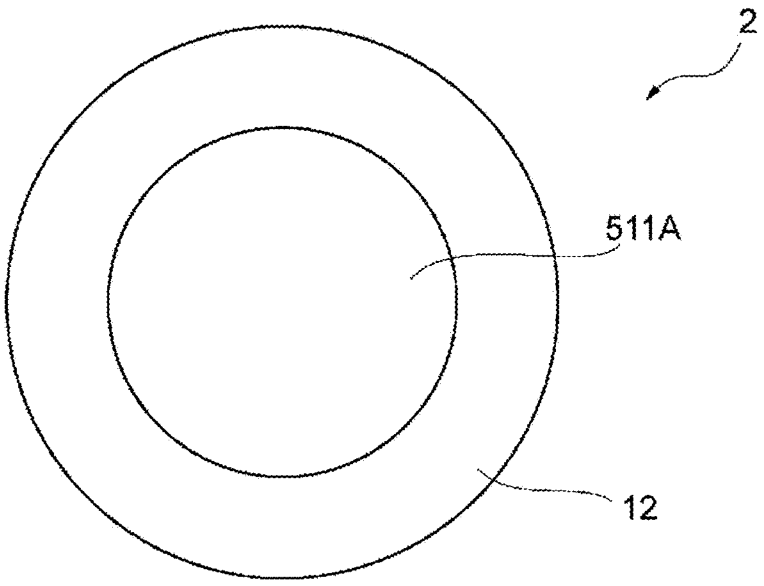

FIG. 4 includes diagrams each illustrating a main part of the filter device 2, in which (A) is a cross-sectional view and (B) is a bottom view. The filter device 2 mainly includes the housing 10, the filter element 20, and a wireless power supply unit 50A.

The wireless power supply unit 50A mainly includes an external member 51A and an internal member 52A. The external member 51A is provided outside the housing 10, and the internal member 52A is provided inside the housing 10. Further, the external member 51A and the internal member 52A are provided with the case 11, here, with the bottom surface 12 interposed therebetween.

The external member 51A mainly includes a core 511A and a coil 512A provided at the core 511A. The internal member 52A mainly includes a core 521A and a coil 522A provided at the core 521A.

The core 511A includes an end member 511*f* (corresponding to the first end member of the present invention) and a coupling portion 511*h* (corresponding to the first coupling portion of the present invention). The end member 511*f* is formed in a tubular shape by bending a belt-like member, and the coupling portion 511*h* is provided at a hollow portion of the tubular end member 511*f*. The coupling portion 511*h* includes a protrusion portion 511*i*, and the coil 512A is provided at the protrusion portion 511*i*.

Same as the core 511A, the core 521A also includes an end member 521*f* (corresponding to the second end member of the present invention) and a coupling portion 521*h* (corresponding to the second coupling portion of the present invention). The end member 521*f* is formed in a tubular shape by bending a belt-like member, and the coupling portion 521*h* is provided at a hollow portion of the tubular end member 521*f*. The coupling portion 521*h* includes a protrusion portion 521*i*, and the coil 522A is provided at the protrusion portion 521*i*.

A distal end 511*g* (corresponding to a first end of the present invention) of the end member 511*f* faces a distal end 521*g* (corresponding to a second end of the present invention) of the end member 521*f* with the bottom surface 12 interposed therebetween. Areas of the distal end 511*g* and the distal end 521*g* are substantially the same as each other.

Note that in the present embodiment, the end members 511*f* and 521*f* have a cylindrical shape, but the shapes of the end members 511*f* and 521*f* are not limited thereto. It is sufficient that the end members 511*f* and 521*f* have a tubular shape, and may have, for example, an elliptical cylindrical shape or a rectangular cylindrical shape. Further, the end member 511*f* and the 521*f* may have a cylindrical shape in which an inner diameter decreases or increases as viewed toward the bottom surface 12.

Since distances between the distal end 511*g* and the distal end 521*g* and the bottom surface 12 are short (the distal ends 511*g* and 521*g* are adjacent to the bottom surface 12), a generated magnetic field is strong. Further, the distal end 511*g* of the core 511A and the distal end 521*g* of the core 521A face each other at a plurality of separated positions with the bottom surface 12 interposed therebetween. For example, the distal ends 511*g* and 521*g* face each other with the bottom surface 12 interposed therebetween at two positions facing each other with the end members 511*f* and 521*f* interposed therebetween. As a result, a pair of strong magnetic fields are generated, and power supply is enabled with a magnetic body interposed therebetween.

According to the present embodiment, the distal end 511*g* and the distal end 521*g* are caused to face each other with the bottom surface 12 interposed therebetween, to generate the pair of strong magnetic fields, so that power can be supplied with a magnetic body interposed therebetween. In addition, data can be transmitted from the external member 51A to the internal member 52A. Further, by measuring an impedance of the internal member 52A, the external member 51A can receive data from the internal member 52A.

Third Embodiment

A third embodiment of the present invention is an embodiment in which a position of the wireless power supply unit 50 is different from that of the filter device 1. Hereinafter, the filter device 3 according to the third embodiment will be described. Note that the same components as those in the first embodiment are denoted by the same reference numerals, and descriptions thereof will be omitted.

Figure 5:
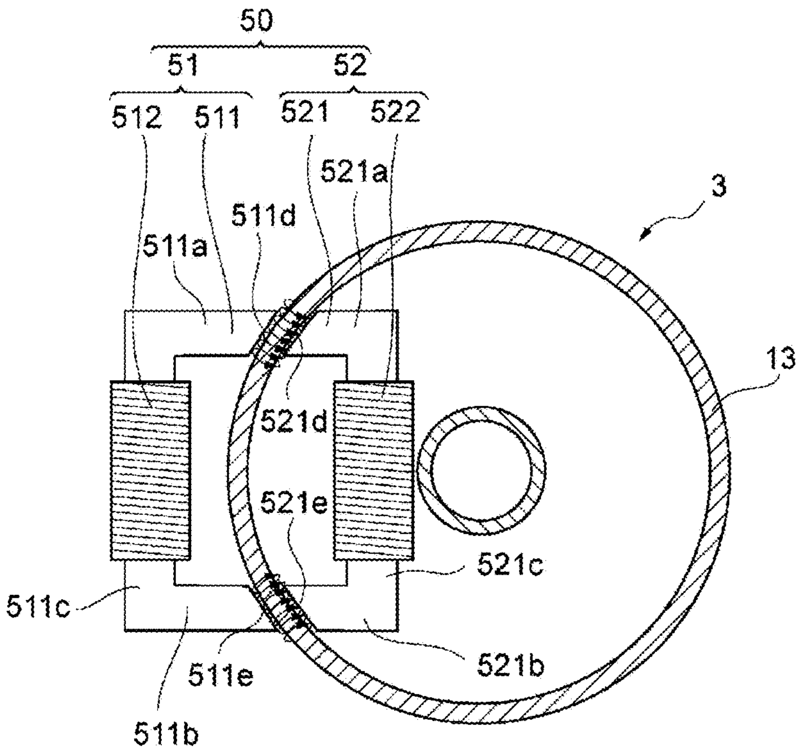
FIG. 5 includes diagrams each illustrating a main part of a filter device 3, in which (A) is a plan view (viewed from above) and (B) is a cross-sectional view.
Figure 5:
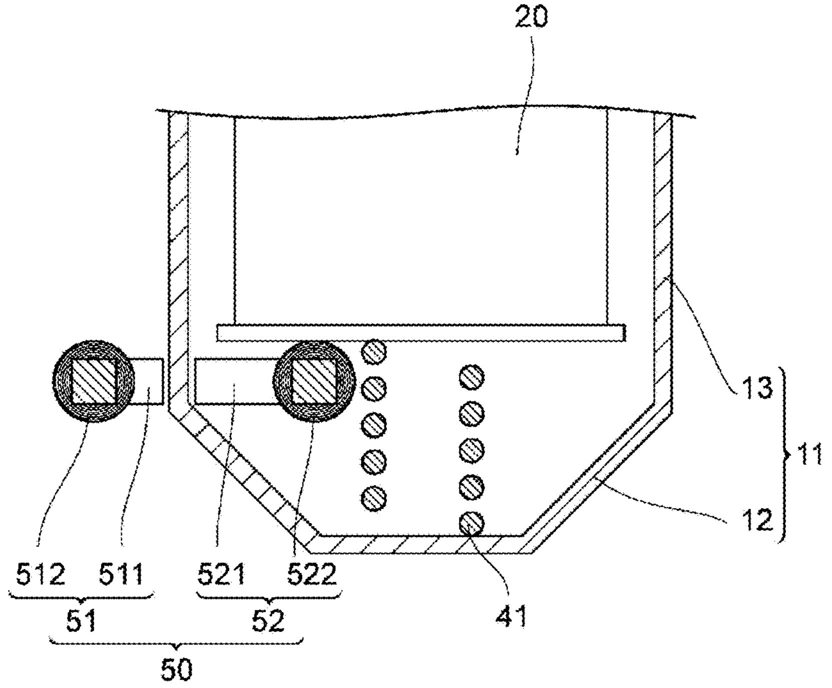

FIG. 5 includes diagrams each illustrating a main part of the filter device 3, in which (A) is a plan view (viewed from above) and (B) is a cross-sectional view. The filter device 3 mainly includes the housing 10, the filter element 20, and the wireless power supply unit 50.

In the filter device 3, the external member 51 and the internal member 52 included in the wireless power supply unit 50 are provided with the side surface 13 interposed therebetween.

The distal end 511*d* faces the distal end 521*d* with the side surface 13 interposed therebetween. Further, the distal end 511*e* faces the distal end 522*e* with the side surface 13 interposed therebetween.

By disposing the cores 511 and 521 in this manner, a magnetic field is generated between the distal end 511*d* and the distal end 521*d*, and a magnetic field is generated between the distal end 511*e* and the distal end 521*e*. Further, since distances between the distal end 511*d* and the distal end 521*d* and the bottom surface 12 are short and distances between the distal end 511*e* and the distal end 522*e* and the bottom surface 12 are short, the generated magnetic fields are strong.

According to the present embodiment, the distal end 511*d* and the distal end 521*d*, and the distal end 511*e* and the distal end 522*e* are caused to face each other with the bottom surface 12 interposed therebetween, to generate a pair of strong magnetic fields, so that power can be supplied with a magnetic body interposed therebetween. In addition, data can be transmitted from the external member 51 to the internal member 52. Further, by measuring an impedance of the internal member 52, the external member 51 can receive data from the internal member 52.

Note that in the present embodiment, the wireless power supply unit 50 is disposed in a vicinity of the bottom surface 12 at the side surface 13, but the disposition of the wireless power supply unit 50 is not limited thereto. For example, the wireless power supply unit 50 may be disposed in a vicinity of the head 15 at the side surface 13. Further, instead of the wireless power supply unit 50, the wireless power supply unit 50A, that is, the external member 51 and the internal member 52 may be provided with the side surface 13 interposed therebetween.

The embodiments of the present invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. Moreover, addition, deletion, replacement, or the like of other configurations can be made on the configurations of the embodiments.

The term "substantially" refers not only to cases where there is an exact match, but also to concepts that include errors and modifications to an extent that does not lose their identity. For example, the term "cylindrical shape" refers not only to strictly cylindrical shapes, but also to concepts that include cases where the shape can be considered to be the same as a cylinder. Further, simple expressions such as orthogonal, parallel, and identical are not to be understood as merely being strictly, for example, orthogonal, parallel, and identical, and include being, for example, substantially parallel, substantially orthogonal, and substantially identical.

The term "vicinity" means that it includes a certain range (which can be determined as desired) of area near the reference position. For example, the term "a vicinity of an end" refers to a range of regions in the vicinity of the end, and is a concept indicating that the end may or need not be included.

REFERENCE SIGNS LIST

1, 2, 3 Filter device
10 Housing
11 Case
12 Bottom surface
13 Side surface
15 Head
15*a* Tubular portion
15*b* Central tube
15*c*, 15*e* Hole
15*d* Hole
17 Mounting member
20 Filter element
21 Filtration member
22 Inner tube
23 Outer tube
24, 25 Plate
30 Holder
40 Conduction portion
41 Elastic member
42 Bypass valve
43 Sealing member
50, 50A Wireless power supply unit
51, 51A External member
52, 52A Internal member
55 External circuit
55*a* Power supply unit
55*b* Acquiring unit
56 Internal circuit
56*a* Receiving unit
56*b* Adjustment unit
60 Sensor
511, 511A, 521, 521A Core
511*a*, 511*b*, 511*f*, 521*a*, 521*b*, 521*f* End member
511*c*, 511*h*, 521*c*, 521*h* Coupling portion
511*d*, 511*e*, 511*g*, 521*d*, 521*e*, 521*g* Distal end
511*i*, 521*i* Protrusion portion
512, 512A, 522, 522A Coil

The invention claimed is:

1. A filter device comprising:
a filter element;
a housing provided with the filter element inside thereof; and
a wireless power supply unit including an external member provided outside the housing, an internal member provided inside the housing, and a power supply unit that supplies power to an external coil included in the external member, wherein
the housing includes a plate portion made of metal formed of a ferromagnetic body,
the external member and the internal member are provided with the plate portion interposed therebetween,
the external member includes an external core provided with the external coil,
the internal member includes an internal coil and an internal core provided with the internal coil,
the external core includes a first end member and a first coupling portion provided with the external coil,
the internal core includes a second end member and a second coupling portion provided with the internal coil, and
a first end that is a distal end of the first end member and a second end that is a distal end of the second end member face each other at a plurality of separated positions with the plate portion interposed therebetween.

2. The filter device according to claim 1, wherein
each of the external core and the internal core comprises a rod or a belt, the first end member includes a third end member and a fourth end member that are spaced apart from each other, the first coupling portion couples the third end member and the fourth end member, the second end member includes a fifth end member and a sixth end member that are spaced apart from each other, the second coupling portion couples the fourth end member and the fifth end member, a third end that is a distal end of the third end member faces a fifth end that is a distal end of the fifth end member with the plate portion interposed therebetween, and a fourth end that is a distal end of the fourth end member faces a sixth end that is a distal end of the sixth end member with the plate portion interposed therebetween.

3. The filter device according to claim 1, wherein each of the first end member and the second end member comprises a bent tubular belt, the first coupling portion is provided at a hollow portion of the first end member having a tubular shape, and the second coupling portion is provided at a hollow portion of the second end member having a tubular shape.

4. The filter device according to claim 1, wherein the power supply unit modulates a current caused to flow through the external coil.

5. The filter device according to claim 1, comprising:

an adjustment unit configured to change an impedance of a circuit including the internal coil; and an acquiring unit configured to acquire a change in the impedance of the circuit by the adjustment unit by measuring a current flowing through the external coil.

6. The filter device according to claim 5 comprising:

a sensor provided inside the housing and adjacent to the internal member, wherein the adjustment unit changes the impedance based on a measurement result of the sensor.

7. The filter device according to claim 2, wherein the power supply unit modulates a current caused to flow through the external coil.

8. The filter device according to claim 3, wherein the power supply unit modulates a current caused to flow through the external coil.

9. The filter device according to claim 2, comprising:

an adjustment unit configured to change an impedance of a circuit including the internal coil; and an acquiring unit configured to acquire a change in the impedance of the circuit by the adjustment unit by measuring a current flowing through the external coil.

10. The filter device according to claim 3, comprising:

an adjustment unit configured to change an impedance of a circuit including the internal coil; and an acquiring unit configured to acquire a change in the impedance of the circuit by the adjustment unit by measuring a current flowing through the external coil.

11. The filter device according to claim 4, comprising:

an adjustment unit configured to change an impedance of a circuit including the internal coil; and an acquiring unit configured to acquire a change in the impedance of the circuit by the adjustment unit by measuring a current flowing through the external coil.

* * * * *